US012122322B2

(12) United States Patent
Morosawa et al.

(10) Patent No.: US 12,122,322 B2
(45) Date of Patent: Oct. 22, 2024

(54) VEHICLE CONTROL SYSTEM, SERVER, AND VEHICLE CONTROL METHOD

(71) Applicant: HONDA MOTOR CO., LTD., Tokyo (JP)

(72) Inventors: Ryo Morosawa, Tokyo (JP); Haisong Liu, Tokyo (JP); Akira Nakajima, Tokyo (JP); Kenji Okuma, Tokyo (JP); Hiroaki Maruyama, Tokyo (JP); Yoshikazu Matsuo, Tokyo (JP); Shuto Higashi, Tokyo (JP); Fumiaki Yamaguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 603 days.

(21) Appl. No.: 17/329,502

(22) Filed: May 25, 2021

(65) Prior Publication Data

US 2021/0370867 A1 Dec. 2, 2021

(30) Foreign Application Priority Data

May 27, 2020 (JP) .................................. 2020-092521

(51) Int. Cl.
*B60R 25/01* (2013.01)
*B60R 25/20* (2013.01)
(Continued)

(52) U.S. Cl.
CPC .............. *B60R 25/01* (2013.01); *B60R 25/20* (2013.01); *B60R 25/31* (2013.01); *E05F 15/73* (2015.01);
(Continued)

(58) Field of Classification Search
CPC ......... B60R 25/01; B60R 25/20; B60R 25/31; B60R 25/305; B60R 25/2045;
(Continued)

(56) References Cited

U.S. PATENT DOCUMENTS

| 2002/0152010 | A1 | 10/2002 | Colmenarez et al. |
| 2015/0254913 | A1* | 9/2015 | Obata ............... G07C 9/30 340/5.72 |

(Continued)

FOREIGN PATENT DOCUMENTS

| CN | 105389490 A | 3/2016 |
| CN | 106406514 A | 2/2017 |

(Continued)

OTHER PUBLICATIONS

Machine Translation of Mabuchi's reference (JP-2017121865-A) (Year: 2017).*

(Continued)

*Primary Examiner* — Tarek Elarabi
(74) *Attorney, Agent, or Firm* — Rankin, Hill & Clark LLP

(57) ABSTRACT

The present invention includes: a vehicle exterior image acquisition unit acquiring a vehicle exterior image, a vehicle interior image acquisition unit acquiring a vehicle interior image, a person recognition unit recognizing, based on the vehicle exterior and interior images, a presence of a person in the vehicle and a motion of a person outside the vehicle, a door control unit controlling a state of a door of the vehicle, and a motion determination unit determining a specific motion to be carried out when the person outside the vehicle instructs an opening operation of the door, wherein the door control unit executes the opening operation when the person outside the vehicle has performed the specific motion, if the presence of a person in the vehicle has been recognized based on a recognition result of the person recognition unit.

7 Claims, 6 Drawing Sheets

(51) Int. Cl.
*B60R 25/30* (2013.01)
*B60R 25/31* (2013.01)
*E05B 81/64* (2014.01)
*E05F 15/73* (2015.01)
*E05F 15/76* (2015.01)
*G06V 20/56* (2022.01)
*G06V 20/59* (2022.01)
*G06V 40/20* (2022.01)

(52) U.S. Cl.
CPC .............. *E05F 15/76* (2015.01); *G06V 20/56* (2022.01); *G06V 20/59* (2022.01); *G06V 40/28* (2022.01); *B60R 25/305* (2013.01); *E05B 81/64* (2013.01); *E05F 2015/767* (2015.01); *E05Y 2400/45* (2013.01); *E05Y 2400/66* (2013.01); *E05Y 2400/85* (2013.01); *E05Y 2900/531* (2013.01)

(58) Field of Classification Search
CPC ... B60R 25/1001; B60R 25/102; B60R 25/24; B60R 2025/1013; B60R 2300/105; B60R 2300/8006; B60R 2300/802; E05F 15/73; E05F 15/76; E05F 2015/767; G06V 20/56; G06V 20/59; G06V 40/28; E05Y 2400/45; E05Y 2400/66; E05Y 2400/85; E05Y 2900/531; E05Y 2400/86; E05Y 2900/53
See application file for complete search history.

(56) References Cited

U.S. PATENT DOCUMENTS

| | | | |
|---|---|---|---|
| 2015/0261304 A1* | 9/2015 | Kamisawa | E05F 15/77 340/5.28 |
| 2016/0063315 A1 | 3/2016 | Lim et al. | |
| 2017/0032599 A1* | 2/2017 | Elie | G07C 9/32 |
| 2018/0268209 A1 | 9/2018 | Sato et al. | |
| 2019/0152433 A1* | 5/2019 | Cumbo | G07C 9/00714 |
| 2019/0176760 A1* | 6/2019 | Uenoyama | B60R 25/305 |
| 2020/0209011 A1 | 7/2020 | Iwasaki et al. | |

FOREIGN PATENT DOCUMENTS

| | | | |
|---|---|---|---|
| CN | 108621939 A | | 10/2018 |
| CN | 110809791 A | | 2/2020 |
| JP | 2003-138817 | | 5/2003 |
| JP | 2017121865 A | * | 7/2017 |
| JP | 2019-183504 A | | 10/2019 |

OTHER PUBLICATIONS

Chinese Office Action dated Nov. 30, 2023, Chinese Application No. 202110533423.A, English translation included, 12 pages.

* cited by examiner

VEHICLE CONTROL SYSTEM, SERVER, AND VEHICLE CONTROL METHOD

INCORPORATION BY REFERENCE

The present application claims priority under 35 U.S.C. § 119 to Japanese Patent Application No. 2020-092521 filed on May 27, 2020. The content of the application is incorporated herein by reference in its entirety.

BACKGROUND OF THE INVENTION

Field of the Invention

The present invention relates to motion control of onboard equipment, and particularly relates to a vehicle control system controlling the operation relating to opening and closing of vehicle doors, a server used in this system, and a vehicle control method.

Description of the Related Art

Entry systems for vehicles that utilize image authentication are known in the conventional art (for example, see Japanese Patent Publication Laid-Open No. 2003-138817). This entry system includes a peripheral monitoring device that detects a person approaching the vehicle using radio waves, ultrasonic waves, infrared light, or a peripheral image of the vehicle, and when a person approaching the vehicle is detected, an image of the person is captured, and identification of the person is carried out using the person's iris. The system is configured to unlock the door if the identification is successful.

According to the above conventional entry system, a person whose iris image is registered in advance may unlock the door simply by approaching the vehicle, which relieves the burden on the user when boarding the vehicle. However, scenarios in which unlocking and other automatic operation of the doors relating to opening and closing of the doors is desirable may include not only a scenario in which the registered user him- or herself boards the vehicle, but also, for example, a scenario in which the user uses the vehicle to go to pick up another person and the other person boards the vehicle.

In this case, a method for automatically unlocking the door when the other person approaches may include advance registration of information for determining whether or not the person approaching the vehicle is a person to be picked up, into the vehicle. However, registering every person who may board the vehicle would make the preparations for using the vehicle cumbersome and inconvenient.

SUMMARY OF THE INVENTION

Problem to be Solved by the Invention

An object of the present invention is to enable vehicle control for controlling an operation relating to opening and closing of the vehicle doors which ensures security of the vehicle while allowing people other than registered vehicle users to smoothly board the vehicle.

Means for Solving the Problem

An aspect of the present invention includes a vehicle exterior image acquisition unit configured to acquire a vehicle exterior image, which is an image of an external surrounding of a vehicle; a vehicle interior image acquisition unit configured to acquire a vehicle interior image, which is an image of an interior of the vehicle; a person recognition unit configured to recognize, based on the vehicle exterior image and the vehicle interior image, a presence of a person in the vehicle and a motion of a person outside the vehicle; a door control unit configured to control a state of a door of the vehicle; and a motion determination unit configured to determine a specific motion to be performed by the person outside the vehicle when instructing an opening operation of the door, wherein the door control unit executes the opening operation on the door when the person outside the vehicle has performed the specific motion determined by the motion determination unit, if the presence of the person in the vehicle has been recognized based on a recognition result of the person recognition unit.

According to another aspect of the present invention, the motion determination unit determines the specific motion at a predetermined timing.

Another aspect of the present invention further includes a storage device configured to store user information including information on a registered user who has been registered in advance as a user of the vehicle and terminal information regarding a terminal device of a person who has a specific relationship to the registered user; a user identifying unit configured to identify, among the persons in the vehicle, a registered user who has been registered in advance as a user of the vehicle; and a motion information distribution unit configured to distribute motion information regarding the specific motion determined by the motion determination unit to a terminal device located outside the vehicle, wherein the motion information distribution unit distributes the motion information to the terminal device of a person who has the specific relationship to the registered user who is a person in the vehicle.

Another aspect of the present invention further includes a motion information providing unit configured to provide, through near-field wireless communication, motion information regarding the specific motion determined by the motion determination unit to a terminal device located outside the vehicle, wherein when communication has been established with a terminal device approaching the vehicle, the motion information providing unit transmits the motion information to the terminal device.

Another aspect of the present invention further includes a motion information providing unit configured to provide, through near-field wireless communication, motion information regarding the specific motion determined by the motion determination unit to a terminal device located outside the vehicle; and a user identifying unit configured to identify, among persons in the vehicle, a registered user who has been registered in advance as a user of the vehicle, wherein the motion information providing unit transmits the motion information to the terminal device in response to receiving a request from the terminal device, on the condition that the presence of the person in the vehicle who is the registered user has been recognized based on a recognition result of the person recognition unit.

According to another aspect of the present invention, the opening operation is an automatic operation of opening the door, or setting the door to be openable from outside the vehicle.

Another aspect of the present invention is a server including the motion determination unit, the server being communicably connected to an onboard device of the vehicle to constitute any of above vehicle control systems.

Yet another aspect of the present invention is a vehicle control method executed by a computer performing vehicle control, the method including the steps of: acquiring a vehicle exterior image, which is an image of an external surrounding of a vehicle; acquiring a vehicle interior image, which is an image of an interior of the vehicle; recognizing, based on the vehicle exterior image and the vehicle interior image, a motion of a person outside the vehicle and a presence of a person inside the vehicle; controlling a state of a door of the vehicle; and determining a specific motion to be performed by the person outside the vehicle when instructing an opening operation of the door, wherein at the step of controlling, the opening operation of the door is executed when the person outside the vehicle has performed the specific motion determined at the step of determining, if the presence of the person in the vehicle has been recognized based on a recognition result of the step of recognizing.

Effects of the Invention

According to an aspect of the present invention, it is possible to enable vehicle control for controlling an operation relating to opening and closing of the vehicle doors which ensures security of the vehicle while allowing people other than registered vehicle users to smoothly board the vehicle.

DETAILED DESCRIPTION OF THE PREFERRED EMBODIMENTS

Figure 1:
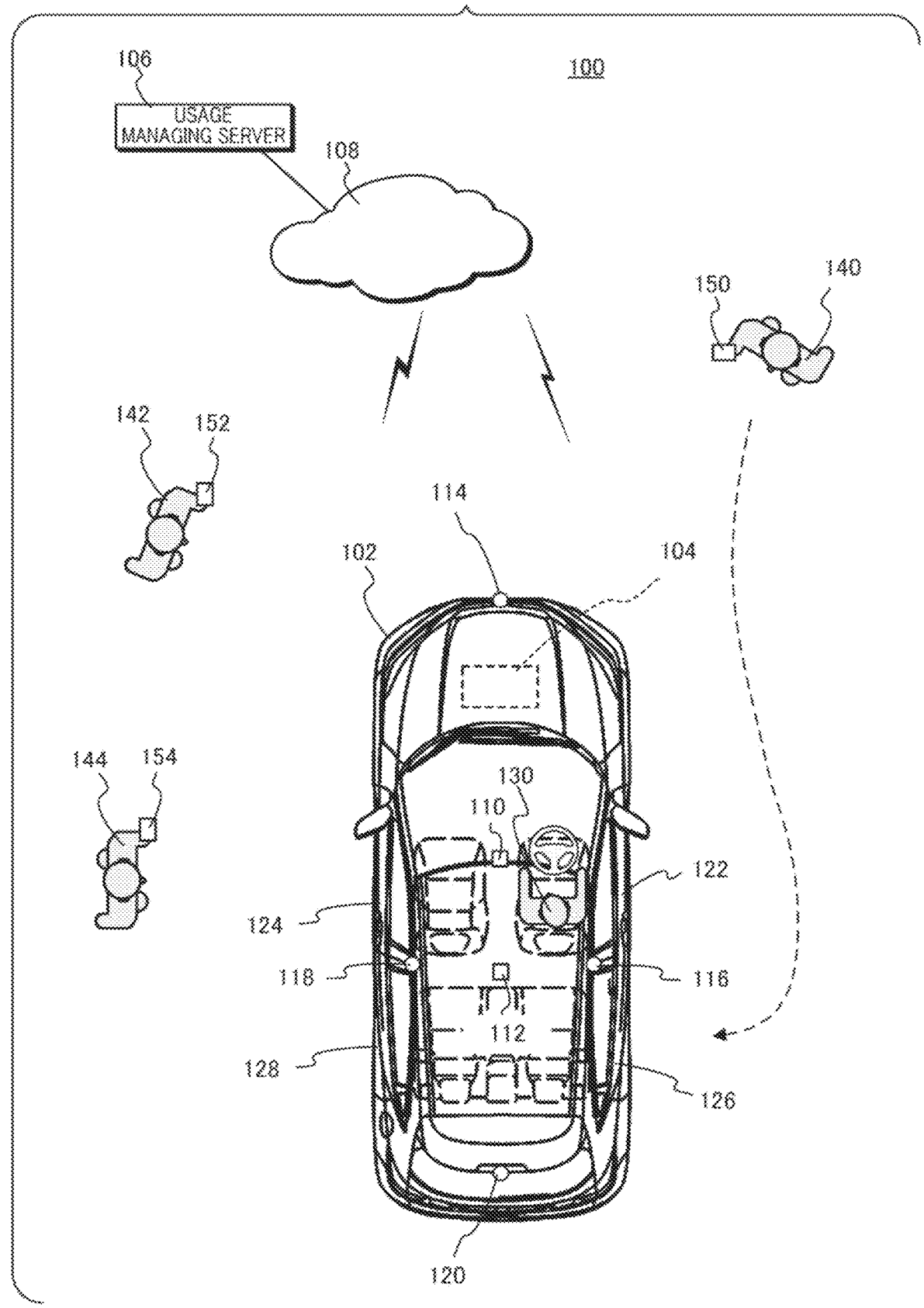
FIG. 1 shows a configuration of a vehicle control system according to an embodiment of the present invention.

An embodiment of the present invention will be described below with reference to the drawings. FIG. 1 shows a configuration of a vehicle control system according to an embodiment of the present invention. The vehicle control system 100 according to the present embodiment is composed of, for example, an onboard system 104 composed of a plurality of electric control units (ECUs) installed in a vehicle 102 and a usage managing server 106, and controls an opening operation of the seat doors of the vehicle 102.

The onboard system 104 and the usage managing server 106 constituting the vehicle control system 100 are communicably connected to each other via a communication network 108. The communication network 108 may be, for example, an open network such as the Internet, or a private network.

The vehicle 102 includes a front seat camera 110 and a rear seat camera 112 which are internal cameras for capturing images of the vehicle interior. The front seat camera 110 is provided, for example, on the rear-view mirror or the dashboard, etc., and captures images of the front half area of the interior of the vehicle 102. The rear seat camera 112 is provided, for example, on the inner surface of the ceiling of the vehicle interior, and captures images of the rear half area of the vehicle interior.

In addition, the vehicle 102 includes a front camera 114, a right side camera 116, a left side camera 118, and a rear camera 120, which are external cameras for capturing images of the vehicle's surroundings. The front camera 114 is provided, for example, on the front bumper, and captures images of the area in front of the vehicle 102 out of the surroundings. The right side camera 116 and the left side camera 118 are provided, for example, on the right-side pillar and left-side pillar of the vehicle 102, and respectively capture images of an area to the right and an area to the left of the vehicle 102 out of the surroundings. The rear camera 120 is provided, for example, on the rear bumper or the upper portion of the tailgate, and captures images of the area behind the vehicle 102 out of the surroundings.

The vehicle 102 may be used, for example, by each of a plurality of users (registered users) who are registered in advance in the usage managing server 106 as users of the vehicle 102. The vehicle 102 may be, for example, a private vehicle or a carshare vehicle.

In the example shown in FIG. 1, the vehicle 102 includes four doors; driver seat door 122 and passenger seat door 124 which are front seat doors, and rear right seat door 126 and rear left seat door 128 which are rear seat doors.

The vehicle control system 100 controls an opening operation of the above four doors of the vehicle 102 based on the presence of a person in the vehicle 102 (person in vehicle) and motions by a person outside the vehicle 102 (person outside vehicle).

Here, a door opening operation refers to an operation of setting the door in a state that allows a person outside the vehicle to board the vehicle 102, and may include, in addition to simply unlocking the door, an operation of automatically opening the door using an actuator provided to the door. Further, for example, for door types in which the handle (door handle or doorknob) for opening and closing the door is stowed inside the door body, unlocking of the door lock as described above may include ejecting the door handle from the door body using an actuator to allow a person outside the vehicle to open the door.

In the scenario shown in FIG. 1, for example, a person 130 who is the current user of the vehicle 102 and is a registered user is present as a person in the vehicle 102, and the three persons 140, 142, and 144 are present as persons outside the vehicle. Each of the persons 140, 142, and 144 has his or her own mobile terminal 150, 152, 154.

The usage managing server 106 stores information on registered users. The usage managing server 106 also stores, for each registered user, information on persons (permitted users) who are permitted to unlock the vehicle 102 when each registered user uses the vehicle 102. In addition, the usage managing server 106 determines, at a specific timing, a specific motion (hereinafter referred to as an unlocking motion) to be performed by a person outside the vehicle 102 when instructing the vehicle 102 to execute a door opening operation. As described below, the unlocking motion may be, for example, a specific movement of the fingers or a specific gesture using the body. In addition, the specific timing may be, for example, a specific time every day.

The onboard system 104 performs facial image authentication of the person 130 sitting in the driver seat of the vehicle 102 based on a vehicle interior image, recognizes the person 130 as the current user, and transmits information on the current user to the usage managing server 106.

The usage managing server 106 receives information indicating the current user (person 130) of the vehicle 102 from the onboard system 104, and transmits the latest information regarding the determined unlocking motion (motion information) to the onboard system 104 and, for example, the mobile terminal 150 of the person 140 who is a permitted user associated with the person 130.

The onboard system 104 receives and stores the motion information from the usage managing server 106. In addition, the onboard system 104 recognizes the presence of persons in the vehicle and motions by persons outside the vehicle based on a vehicle exterior image and a vehicle interior image. If the presence of a person in the vehicle has been recognized based on the recognition result, the onboard system 104 executes the opening operation of a seat door of the vehicle 102 when a person outside the vehicle has performed the unlocking motion indicated by the received motion information.

In the scenario shown in FIG. 1, the person 140, who is a permitted user, receives the motion information by the mobile terminal 150, and recognizes the unlocking motion indicated by the motion information. Then, the person 140 approaches the vehicle 102 (indicated by the dashed arrow in the drawing) and performs the unlocking motion within view of any of the external cameras of the vehicle 102, for example, the right side camera 116. The onboard system 104 detects the presence of the person 130 as a person inside the vehicle and recognizes the unlocking motion performed by the person 140 outside the vehicle, and executes an opening operation of, for example, the rear right seat door 126 which is the closest to the person 140 at that time.

In other words, the vehicle control system 100 determines the unlocking motion at a specific timing, authenticates that the person outside the vehicle is a permitted user associated with the current user by recognizing whether or not the person outside the vehicle has performed the latest unlocking motion, and executes an opening operation of the door on the premise that a person is present in the vehicle. This allows the vehicle control system 100 to ensure security of the vehicle 102 while supporting smooth boarding by persons other than registered users.

Next, with reference to FIG. 2, the configuration of the usage managing server 106 constituting the vehicle control system 100 will be described. The usage managing server 106 has a processing device 200, a communication device 202 (transmitter/receiver, circuit), and a storage device 204. The communication device 202 is a wireless communication device and/or a wired communication device for communicating with the onboard system 104 or the mobile terminal 150, etc. via the communication network 108.

The storage device 204 is composed of, for example, a volatile and/or non-volatile semiconductor memory and/or a hard disk device, etc. The storage device 204 stores user information 206. The user information 206 is composed of registered user information 208 for each registered user of the vehicle 102. In addition, each piece of registered user information 208 includes facial image information 210 of a corresponding registered user, personal information 212 including an ID code for identifying the registered user, and specific user information 214 of persons (specific permitted users) that have a specific relationship to the registered user.

The specific relationship mentioned here may be, for example, a blood relation such as family or relatives, or a relation such as close friends, acquaintances, etc. of the registered user. The specific user information 214 includes, for each specific permitted user, information indicating his or her relationship to the registered user, and terminal information for communicating with a terminal device (for example, a mobile terminal) of the specific permitted user.

In addition, the registered user information 208 includes first permitted user information 216 and second permitted user information 218 which is information respectively regarding a first permitted user and a second permitted user. The first permitted user is a user who is permitted to unlock the doors of the vehicle 102 when the corresponding registered user is using the vehicle 102, and may, as described later, receive motion information regarding the unlocking motion determined by a motion determination unit 230 (described later) regardless of whether or not the registered user is in the vehicle 102.

The second permitted user is a user who is permitted to unlock the doors of the vehicle 102 when the corresponding registered user is using the vehicle 102, and, as described later, may receive motion information regarding the unlocking motion determined by the motion determination unit 230 only while the registered user is in the vehicle 102. The first permitted user and the second permitted user may be, for example, friends or acquaintances, etc. of the registered user.

The first permitted user information 216 and the second permitted user information 218 respectively include terminal information for communicating with a terminal device (for example, a mobile terminal) of each first permitted user and terminal information for communicating with a terminal device (for example, a mobile terminal) of each second permitted user.

Here, in the scenario shown in FIG. 1, the persons 140, 142, and 144 are respectively a specific permitted user, a first permitted user, and a second permitted user.

The processing device 200 is, for example, a computer having a processor such as a CPU, etc. The processing device 200 includes as functional elements or functional units, the motion determination unit 230, a motion information distribution unit 232, a user registration unit 234, and a user information providing unit 236.

These functional elements of the processing device 200 are realized, for example, by the processing device 200, which is a computer, executing a program. This computer program may be stored on any computer-readable storage medium. As an alternative, part or all of the above functional elements of the processing device 200 may be constituted by hardware including respectively one or more electronic circuit components.

The motion determination unit 230 determines, at a specific timing determined in advance (for example, a specific time every day), an unlocking motion to be performed by a person outside the vehicle who is a permitted user when instructing a door opening operation of the vehicle 102. This unlocking motion may be a motion of forming a specific shape with the fingers, moving the fingers and arms in a specific pattern, a specific gesture using the body, or a motion combining these motions with a specific sound, etc.

Figure 3:
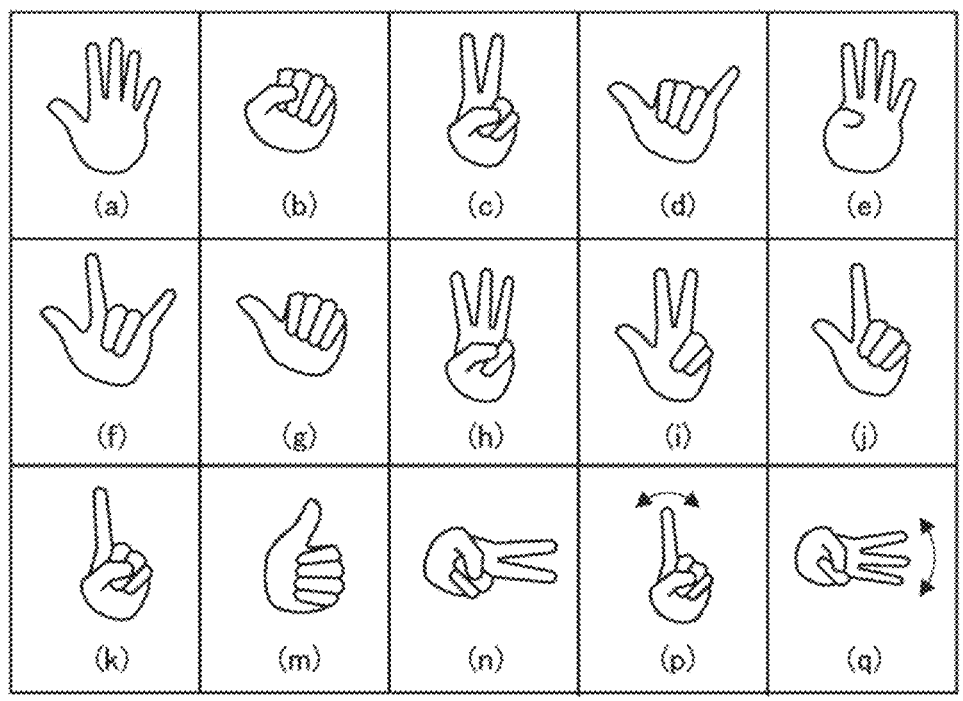
FIG. 3 shows examples of unlocking motions to be performed by a person outside the vehicle, determined by the usage managing server shown in FIG. 2.

FIG. 3 shows examples of unlocking motions determined by the motion determination unit 230. FIG. 3 shows 15 types of unlocking motions forming a specific shape with the fingers in a table format from motion (a) to motion (q). Motions (a) to (n) are motions of forming a specific shape with the fingers, motion (p) is a motion of waving the fingertips in the shape of the fingers shown in motion (k) left and right, and motion (q) is a motion of holding the shape of the fingers shown in motion (h) sideways and waving the fingertips up and down. As a variant of the examples shown in FIG. 3, for example, motion of showing a plurality of different shapes selected from these finger shapes in sequence may be used as the unlocking motion.

Figure 2:
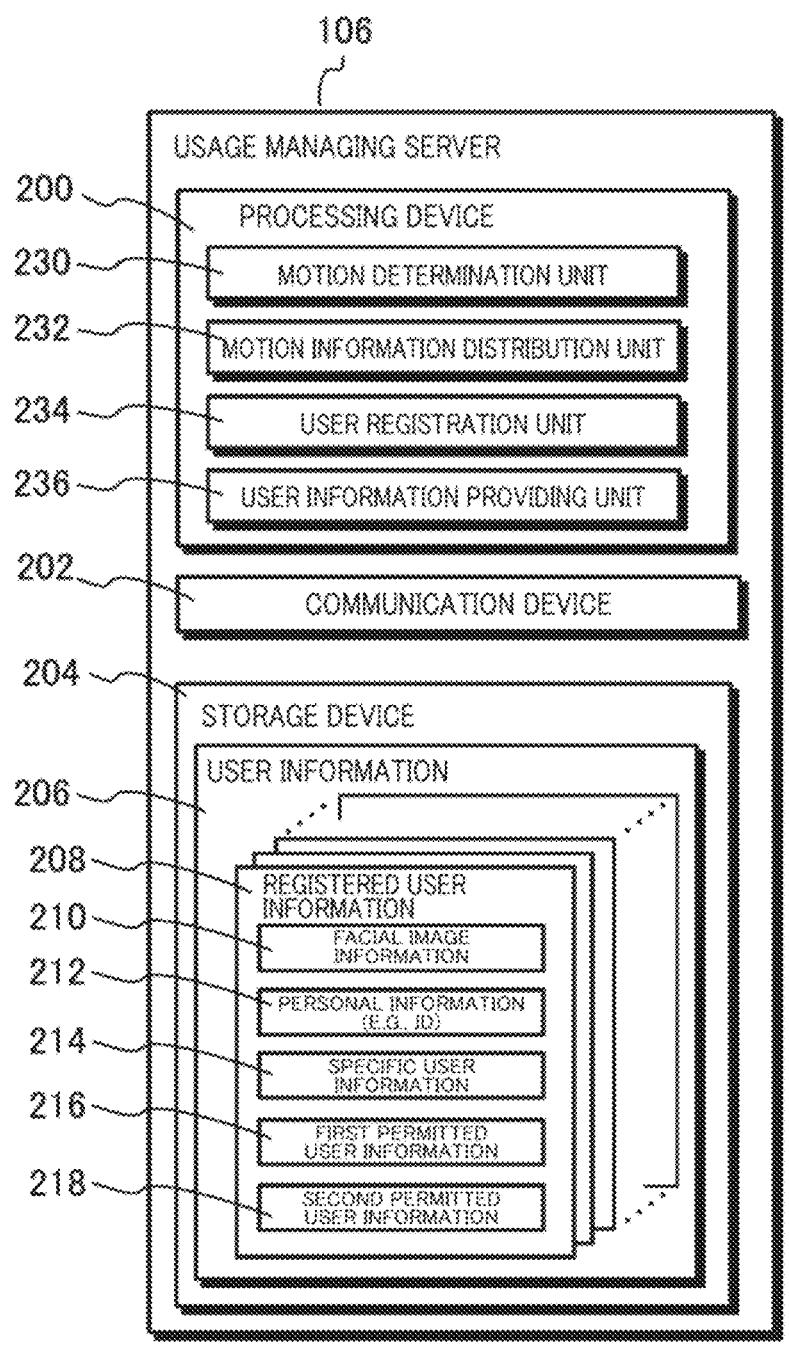
FIG. 2 shows an example of a configuration of a usage managing server constituting the vehicle control system shown in FIG. 1.

Referring to FIG. 2, the motion information distribution unit 232 transmits motion information indicating the unlocking motion determined by the motion determination unit 230 to the vehicle 102. The motion information distribution unit 232 also distributes the motion information to a terminal device located outside the vehicle 102. Specifically, the motion information distribution unit 232 distributes the motion information to the terminal device of a person (in other words, a specific permitted user) who has a specific relationship to the registered user (for example, the current user) who is the person in the vehicle.

More specifically, upon receipt of the information on the current user of the vehicle 102 from the onboard system 104, the motion information distribution unit 232 references the registered user information 208 regarding the current user included in the user information 206 stored in the storage device 204. Then, based on the specific user information 214 included in the referenced registered user information 208, the motion information distribution unit 232 transmits the motion information to the terminal device (for example, a mobile terminal) of the specific permitted user who has a specific relationship to the current user. This allows a specific permitted user who has received the motion information to his or her own terminal device to make the vehicle 102 execute a door opening operation by performing the unlocking motion indicated by the motion information.

Here, the motion information distribution unit 232 may transmit the motion information to the terminal devices of all specific permitted users included in the specific user information 214, or extract, from the specific permitted users, specific permitted users who have a more specific relationship, and transmit the motion information to the terminal devices of the extracted specific permitted users. In this case, the specific relationship subject to extraction may be, out of the above specific relationships, for example, only family of the current user, etc. The specific relationship to be used by the motion information distribution unit 232 in the extraction may be, for example, determined in advance as a rule to be applied to all registered users, or may be determined in advance by each registered user and stored in the registered user information 208.

Further, upon receipt of a transmission request for the motion information from the terminal device of a specific permitted user or a first permitted user, the motion information distribution unit 232 transmits the motion information to the terminal device from which the transmission request was sent. Whether or not the received transmission request was sent from the terminal device of a specific permitted user or a first permitted user can be determined, for example, based on the communication address of the sender or an ID code sent together with the transmission request.

The user registration unit 234 stores registered user information 208 regarding each registered user in the storage device 204. The user registration unit 234 may, for example, collect information such as facial images etc. transmitted by each registered user via a mobile terminal etc., generate registered user information 208 for each registered user and store it in the storage device 204.

The user information providing unit 236, in response to a request from the onboard system 104, references the user information 206 in the storage device 204, and transmits registered user information 208 regarding the registered user indicated by the request to the onboard system 104.

Figure 4:
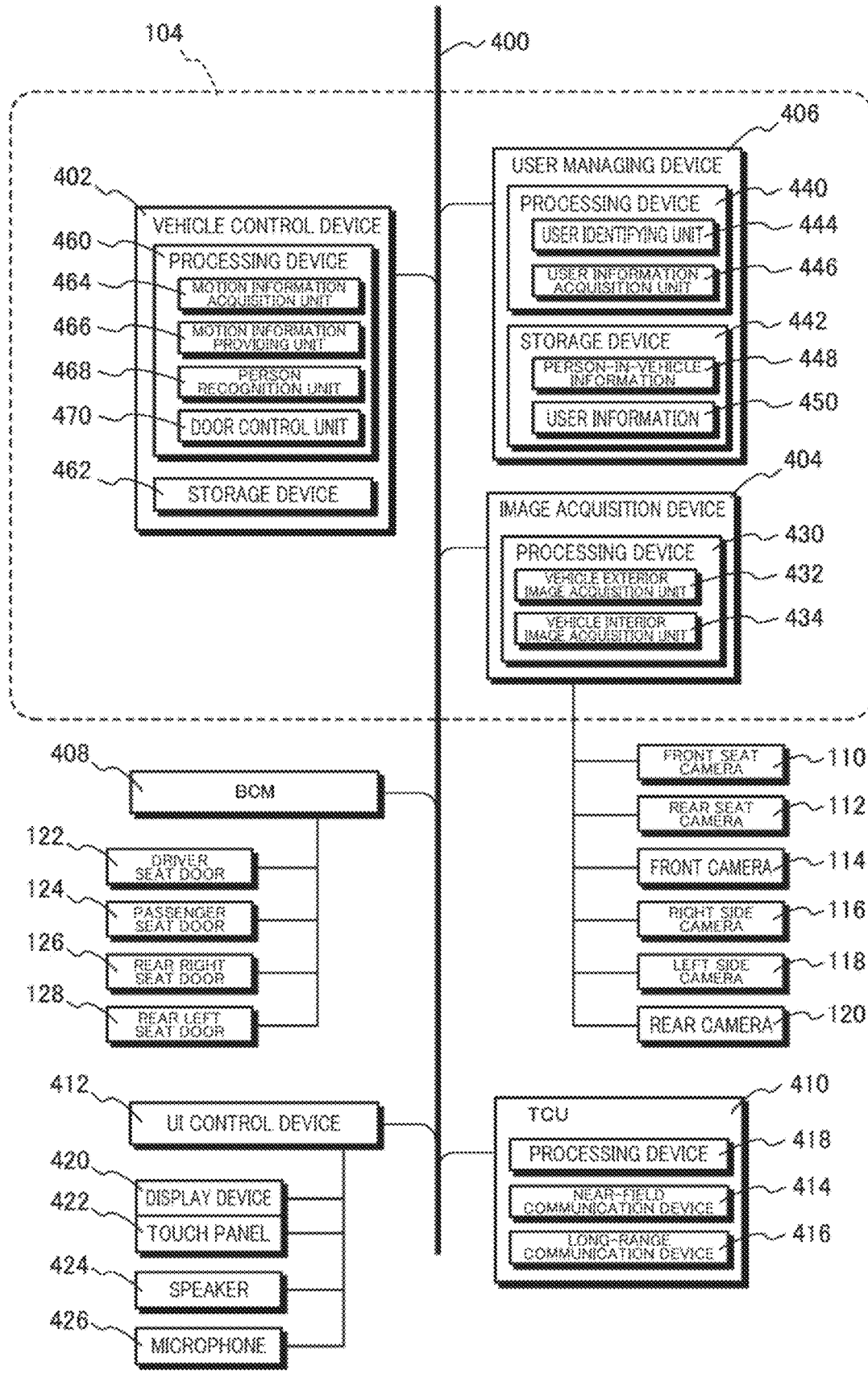
FIG. 4 shows an example of a configuration of an onboard system constituting the vehicle control system shown in FIG. 1.

Next, with reference to FIG. 4, the configuration of the onboard system 104 will be described. In the present embodiment, the onboard system 104 is composed of a vehicle control device 402, an image acquisition device 404, and a user managing device 406, which are onboard electronic control units (ECUs).

The vehicle control device 402, the image acquisition device 404, and the user managing device 406 are communicably connected to one another via an onboard network bus 400. Further connected to the onboard network bus 400 are a body control module (BCM) 408, a telematic control unit (TCU) 410, and a user interface (UI) control device 412.

The BCM 408 includes a processing device such as a CPU (not shown), and controls actuators provided to the driver seat door 122, the passenger seat door 124, the rear right seat door 126, and the rear left seat door 128 of the vehicle 102, in order to control an opening operation of these doors. The BCM 408 also detects an on/off operation of an ignition key (not shown) of the vehicle 102, and notifies the detected result to the other devices.

The TCU 410 includes a near-field communication device 414 (transmitter/receiver, circuit), a long-range communication device 416 (transmitter/receiver, circuit), and a processing device 418 that controls operations of these communication devices. The processing device 418 is, for example, a computer having a processor such as a CPU. The near-field communication device 414 is, for example, a wireless communication device that communicates with the mobile terminal 150 etc. according to the Bluetooth® communication standard. The long-range communication device 416 is a wireless communication device for communicating with, for example, the usage managing server 106 and the mobile terminal 150, etc. via the communication network 108.

The UI control device 412 includes a processing device such as a CPU (not shown), displays images on a display device 420 (display) provided to the interior of the vehicle 102 based on instructions from other devices of the vehicle 102 such as the vehicle control device 402, and outputs audio from a speaker 424. The UI control device 412 also acquires audio from the vehicle interior and exterior from a microphone 426, performs audio recognition processing on the audio, and outputs the audio and/or the result of the audio recognition processing to the other devices. The UI control device 412 also acquires instructions and/or data input from an occupant of the vehicle 102 via a touch panel 422 provided on a display screen of the display device 420, and outputs the acquired instructions and/or data to the other devices.

The image acquisition device 404 constituting the onboard system 104 includes a processing device 430 which is a computer including a processor such as a CPU, and includes as functional elements or functional units a vehicle exterior image acquisition unit 432 and a vehicle interior image acquisition unit 434. These functional elements are realized, for example, by the processing device 430, which is a computer, executing a program. This computer program may be stored on any computer-readable storage medium. As an alternative, part or all of the above functional elements of the processing device 430 may be constituted by hardware including respectively one or more electronic circuit components.

The vehicle exterior image acquisition unit 432 controls the front camera 114, the right side camera 116, the left side camera 118, and the rear camera 120, and acquires vehicle exterior images, which are images of the external surroundings of the vehicle 102, from these external cameras. In addition, the vehicle interior image acquisition unit 434 controls the front seat camera 110 and the rear seat camera 112, and acquires vehicle interior images, which are images of the interior of the vehicle 102, from these internal cameras. The vehicle exterior images and the vehicle interior images may be still images captured repeatedly at predetermined time intervals, or a video with a predetermined framerate. The image acquisition device 404 outputs the acquired vehicle exterior images and vehicle interior images to the other devices via the onboard network bus 400.

The user managing device 406 constituting the onboard system 104 manages information regarding persons occupying the vehicle 102.

Specifically, the user managing device 406 includes a processing device 440 and a storage device 442. The storage device 442 is composed of, for example, a volatile and/or non-volatile semiconductor memory, and/or a hard disk device, etc. The processing device 440 is, for example, a computer having a processor such as a CPU. The processing device 440 includes as functional elements or functional units a user identifying unit 444 and a user information acquisition unit 446.

These functional elements of the processing device 440 are realized, for example, by the processing device 440, which is a computer, executing a program. This computer program may be stored on any computer-readable storage medium. As an alternative, part or all of the above functional elements of the processing device 440 may be constituted by hardware including respectively one or more electronic circuit components.

The user identifying unit 444 receives a vehicle interior image from the image acquisition device 404, and, based on the received vehicle interior image, performs facial image authentication on each person in the vehicle 102 to identify whether or not the person in the vehicle is a registered user. Specifically, the user identifying unit 444 acquires from the usage managing server 106 the facial image information 210 and personal information 212 regarding each registered user already registered in the usage managing server 106 and compares them to the facial image of the person in the vehicle in the vehicle interior image to determine whether or not each person in the vehicle is a registered user.

Based on the result of the facial image authentication, the user identifying unit 444 stores, in the storage device 442, person-in-vehicle information 448 composed of, for example, a facial image of each person in the vehicle and identification information indicating whether each person in the vehicle is a registered user or an unregistered user. The identification information may include, for example, an ID code etc. included in the personal information 212 of each registered user. In this way, of the persons in the vehicle 102, a person in the vehicle whose identification information including the ID code is stored in association with the facial image in the person-in-vehicle information 448 can be determined to be a registered user.

The user identifying unit 444 also identifies a registered user occupying the driver seat when use of the vehicle 102 is started as the current user of the vehicle 102, and, in the person-in-vehicle information 448, adds information to the identification information stored in association with the facial image of the current user to indicate that the person in the facial image is the current user. Further, upon identifying the current user, the user identifying unit 444 transmits information indicating the current user (for example, an ID code) to the usage managing server 106.

In the scenario shown in FIG. 1, the user identifying unit 444 identifies the person 130 occupying the driver seat of the vehicle 102 as the registered user and the current user, stores person-in-vehicle information 448 regarding the person 130 in the storage device 442, and transmits the ID code of the person 130 as information indicating the current user to the usage managing server 106.

The user information acquisition unit 446 references the person-in-vehicle information 448 stored by the user identifying unit 444 to identify the current user, acquires the registered user information 208 of the current user from the usage managing server 106, and stores it in the storage device 442 as user-related information 450. In other words, the user-related information 450 may include the facial image information 210, the personal information 212, the specific user information 214, the first permitted user information 216, and the second permitted user information 218 included in the registered user information 208 of the current user.

In the scenario shown in FIG. 1, the user-related information 450 stored in the storage device 442 by the user information acquisition unit 446 includes specific user information 214 including information on the person 140 who is a specific permitted user, first permitted user information 216 including information on the person 142 who is a first permitted user, and second permitted user information 218 including information on the person 144 who is a second permitted user.

The vehicle control device 402 constituting the onboard system 104 instructs the BCM 408 to control an opening operation of the vehicle doors based on the vehicle exterior image and vehicle interior image received from the image acquisition device 404.

Specifically, the vehicle control device 402 includes a processing device 460 and a storage device 462. The storage device 462 is composed of, for example, a volatile and/or non-volatile semiconductor memory and/or a hard disk device. The processing device 460 is, for example, a computer having a processor such as a CPU. The processing device 460 includes as functional elements or functional units a motion information acquisition unit 464, a motion information providing unit 466, a person recognition unit 468, and a door control unit 470.

These functional elements of the processing device 460 are realized, for example, by the processing device 460, which is a computer, executing a program. This computer program may be stored on any computer-readable storage medium. As an alternative, part or all of the above functional elements of the processing device 460 may be constituted by hardware including respectively one or more electronic circuit components.

The motion information acquisition unit 464 acquires motion information regarding the unlocking motion determined by the motion determination unit 230 from the usage managing server 106. The motion information acquisition unit 464 may receive and acquire motion information transmitted by the motion information distribution unit 232 of the usage managing server 106 when the motion determination unit 230 has determined the unlocking motion. In addition to or instead of this, the motion information acquisition unit 464 may transmit a transmission request to the usage managing server 106 to acquire the motion information when a specific operation indicating start of use of the vehicle 102 (for example, an "on" operation of the ignition key) has been performed, or at predetermined time intervals.

The motion information providing unit 466 provides the motion information acquired by the motion information acquisition unit 464, in other words the motion information regarding the unlocking motion determined by the motion determination unit 230 of the usage managing server 106, to a terminal device outside the vehicle 102 (for example, a mobile terminal) through near-field wireless communication. Specifically, the motion information providing unit 466 transmits the motion information from the near-field communication device 414 to a mobile terminal of a person outside the vehicle who is a first permitted user when, for example, the near-field communication device 414 of the TCU 410 has established communication, directly, without going through another communication device, with the mobile terminal of the person outside the vehicle who has approached into a range at a predetermined distance from the vehicle 102 (for example, the communicable range of the near-field communication device 414). This allows a first permitted user who has received the motion information to his or her own mobile terminal to make the vehicle 102 execute a door opening operation by performing the unlocking motion indicated by the motion information.

In the scenario shown in FIG. 1, the motion information providing unit 466 transmits the motion information to the mobile terminal 152 held by the person 142 who is a first permitted user when the person 142 approaches the vehicle 102 and communication is established between the mobile terminal 152 and the near-field communication device 414.

In addition, the motion information providing unit 466 transmits the motion information from the near-field communication device 414 to a mobile terminal of a person outside the vehicle who is a second permitted user when the near-field communication device 414 of the TCU 410 has established communication, directly, without going through another communication device, with the mobile terminal of the person outside the vehicle who has approached into a range at a predetermined distance from the vehicle 102 (for example, the communicable range of the near-field communication device 414), on the condition that there is a person in the vehicle 102 who is a registered user. This allows a second permitted user who has received the motion information to his or her own mobile terminal to make the vehicle 102 execute a door opening operation by performing the unlocking motion indicated by the motion information.

Here, the motion information providing unit 466 may determine whether or not a person who is a registered user is present in the vehicle 102 based on a recognition result from the person recognition unit 468 described later and the person-in-vehicle information 448 stored by the user managing device 406. In this case, the motion information providing unit 466 may notify the registered user in the vehicle 102 that the motion information has been transmitted to the mobile terminal of the person outside the vehicle who is a second permitted user. For example, the motion information providing unit 466 may instruct the UI control device 412 to display the notification on the display device 420 and/or emit it as audio from the speaker 424.

This allows the person in the vehicle who is a registered user to learn in advance that the second permitted user is able to board the vehicle. Alternatively, the motion information providing unit 466 may be configured to transmit the motion information to the mobile terminal of the person outside the vehicle who is a second permitted user when the person in the vehicle who is a registered user has permitted transmission of the motion information by an input operation using the touch panel 422 or a voice command via the microphone 426.

In the scenario shown in FIG. 1, the person 130 who is a registered user is present in the vehicle 102, so the motion information providing unit 466 transmits the motion information to the mobile terminal 154 held by the person 144 who is a second permitted user when the person 144 approaches the vehicle 102 and communication is established between the mobile terminal 154 and the near-field communication device 414.

Based on the vehicle exterior image and vehicle interior image received from the image acquisition device 404, the person recognition unit 468 recognizes the presence of persons outside and inside the vehicle, and the motion of the person outside the vehicle. In particular, the person recognition unit 468 recognizes whether or not the person outside the vehicle has performed the unlocking motion indicated by the motion information based on the motion information acquired by the motion information acquisition unit 464. Then, the person recognition unit 468 sends the result of these recognitions (recognition result) to the motion information providing unit 466 and the door control unit 470.

If the presence of a person in the vehicle has been recognized based on the recognition result of the person recognition unit 468, the door control unit 470 instructs the BCM 408 to execute the opening operation on a door of the vehicle 102 when the person outside the vehicle has performed the unlocking motion indicated by the motion information acquired by the motion information acquisition unit 464. In this case, the door control unit 470 may be configured to, for example, execute the door opening operation on the door closest to the person outside the vehicle who has performed the unlocking motion.

In the scenario shown in FIG. 1, when, for example, the person recognition unit 468 has recognized the motion of a person 144 outside the vehicle approaching the left of the vehicle 102 as the unlocking motion, the door control unit 470 instructs the BCM 408 to execute the door opening operation on the passenger seat door 124 which is the closest to the person 144.

The vehicle control system 100 as described above, for example, transmits motion information indicating an unlocking motion determined every day to users permitted by a registered user, and when a person outside the vehicle has performed the unlocking motion, the system executes the door opening operation on a door of the vehicle 102 on the condition that a person is present in the vehicle 102. This allows the vehicle control system 100 to ensure security of the vehicle 102 while supporting smooth boarding by persons other than registered users.

Figure 5:
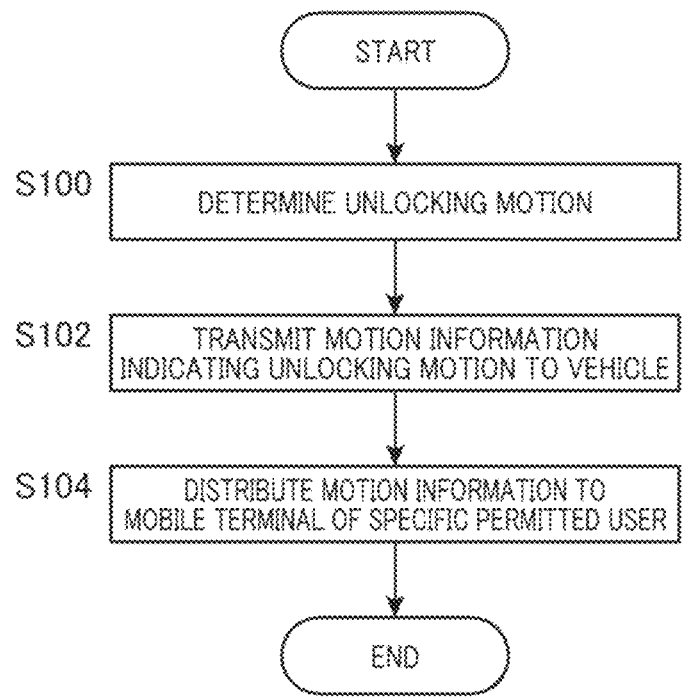
FIG. 5 is a flowchart showing a procedure of an operation of the usage managing server constituting the vehicle control system shown in FIG. 1.
Figure 6:
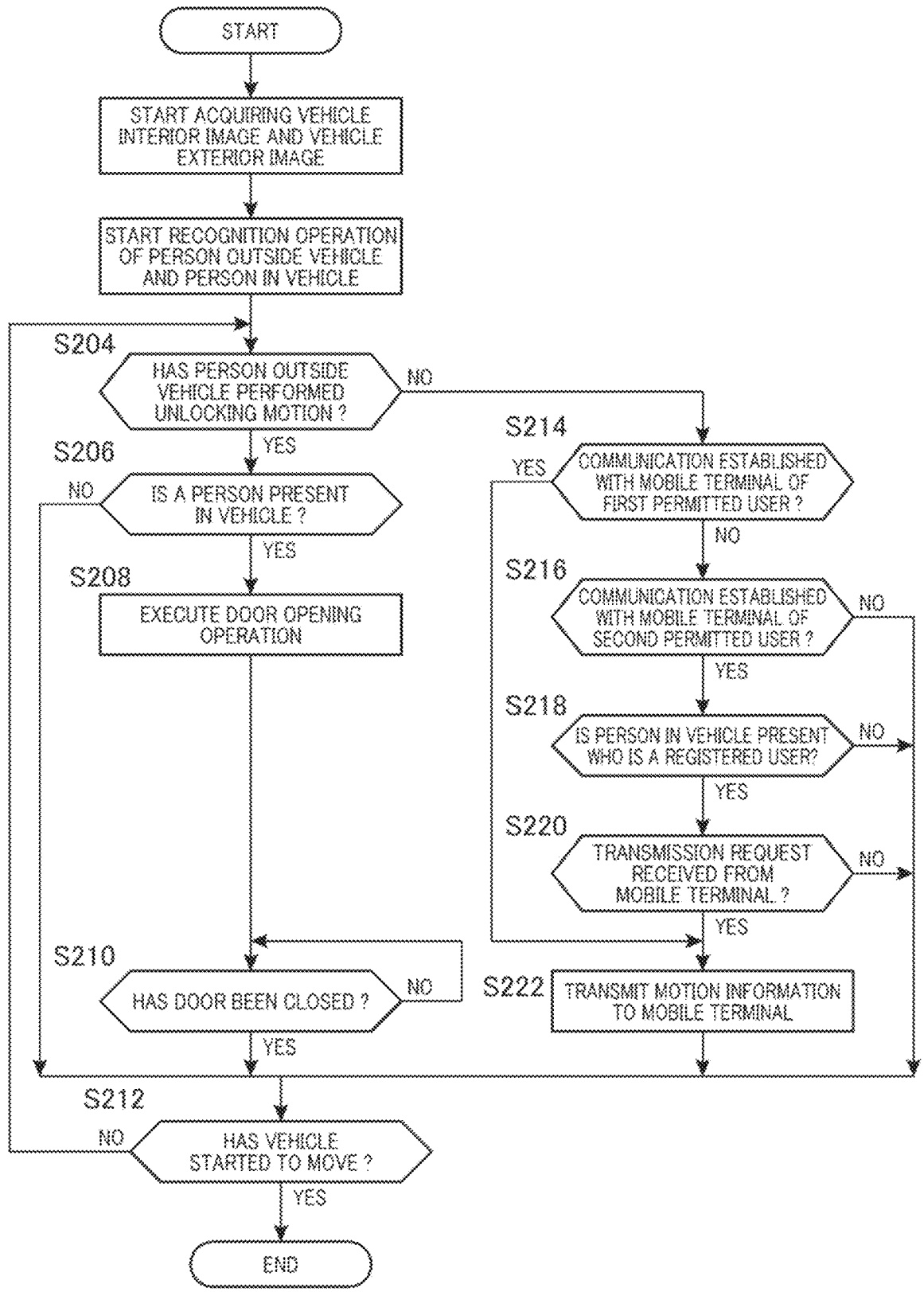
FIG. 6 is a flowchart showing a procedure of an operation of the onboard system constituting the vehicle control system shown in FIG. 1.

Next, a process of the vehicle control system 100 will be described. FIG. 5 and FIG. 6 are flowcharts which respectively show a procedure of a process of the usage managing server 106 and the onboard system 104 constituting the vehicle control system 100.

First, the process of the usage managing server 106 shown in FIG. 5 will be described. This process is initiated when a predetermined timing has arrived while the power supply of the usage managing server 106 is turned on. This timing may be set to, for example, 3 o'clock every morning, etc. The usage managing server 106 recognizes the arrival of the predetermined timing using its own timer (not shown). Alternatively, the predetermined timing may be when a specific operation indicating start of use of the vehicle 102 has been performed. The usage managing server 106 may be configured to, when the specific operation indicating start of use has been performed, receive a notification from the vehicle control device 402 of the onboard system 104 indicating the same.

Moreover, the usage managing server 106 is configured to execute the following process in parallel to the process shown in FIG. 5. First, the user registration unit 234, in response to receiving information from a mobile terminal etc. of a person who desires to use the vehicle 102, generates registered user information 208 for the person and stores the information in the storage device 204. In addition, the motion information distribution unit 232, in response to information indicating the current user (for example, an ID code) being transmitted from the vehicle 102, receives and stores the information. In addition, the user information providing unit 236, in response to receiving a transmission request from the vehicle 102, transmits the registered user information 208 on the current user to the vehicle 102.

When the process shown in FIG. 5 is initiated, the motion determination unit 230 determines what kind of motion to set as the unlocking motion (S100). Next, the motion information distribution unit 232 transmits motion information indicating the unlocking motion determined above to the onboard system 104 of the vehicle 102 (S102). In addition, the motion information distribution unit 232 references the registered user information 208 of the current user of the vehicle 102 (the registered user currently using the vehicle 102) and transmits the motion information to a mobile terminal of a specific permitted user indicated by specific user information (S104), after which the process ends.

Next, the process of the onboard system 104 shown in FIG. 6 will be described. This process is initiated when the vehicle 102 has stopped or parked, or, for example, when the vehicle speed has dropped to less than a predetermined speed (for example, 5 km/h). The devices constituting the onboard system 104 may be configured to acquire information regarding the vehicle speed of the vehicle 102 via the BCM 408 connected to, for example, a vehicle speed sensor (not shown).

Moreover, the user managing device 406 of the onboard system 104 executes the following process in parallel to the process shown in FIG. 6. First, during, for example, a period of time from when a specific operation indicating start of use of the vehicle 102 has been performed until when a specific operation indicating end of use has been performed, the user managing device 406 recognizes persons that board and exit the vehicle 102 based on the vehicle interior images acquired by the image acquisition device 404, and stores person-in-vehicle information 448 and user-related information 450 in the storage device 442. In addition, when use of the vehicle 102 has started, the user identifying unit 444 of the user managing device 406 identifies a current user (a registered user currently using the vehicle 102) based on the vehicle interior images acquired by the image acquisition device 404, and transmits an ID code of the current user to the usage managing server 106. Further, the user information acquisition unit 446 of the user managing device 406 acquires registered user information 208 of the current user from the usage managing server 106.

Further, in parallel to the process shown in FIG. 6, the motion information acquisition unit 464 of the vehicle control device 402 acquires motion information indicating the latest unlocking motion from the usage managing server 106 when use of the vehicle 102 has started.

Here, the above specific operation indicating start of use and specific operation indicating end of use may respectively be an "on" operation and an "off" operation of the ignition key of the vehicle 102, performed, for example, by the current user. The user managing device 406 and the vehicle control device 402 may be configured to acquire an indication that an "on" operation or "off" operation has been performed with respect to the ignition key from the BCM 408 connected to, for example, an ignition key sensor (not shown).

When the process shown in FIG. 6 is started, the image acquisition device 404 of the onboard system 104 starts acquiring vehicle exterior images and vehicle interior images (S200). Further, the person recognition unit 468 of the vehicle control device 402 starts a recognition operation of the presence of persons outside and inside the vehicle and motions (S202).

Next, the door control unit 470 of the vehicle control device 402 determines, based on the current recognition result of the person recognition unit 468, whether or not a person outside the vehicle has performed an unlocking motion indicated by the acquired motion information (S204). If the person outside the vehicle has performed the unlocking motion (S204, YES), the door control unit 470 determines, based on the current recognition result of the person recognition unit 468, whether or not a person is present in the vehicle 102 (S206).

Then, if a person is present in the vehicle 102 (S206, YES), the door control unit 470 instructs the BCM 408 to perform an opening operation on a door of the vehicle 102 (S208). In this case, out of the seats not occupied by a person in the vehicle or baggage, etc., the door control unit 470 may be configured to execute the opening operation on, for example, the door of the seat closest to the person outside the vehicle who has performed the unlocking motion.

Next, the door control unit 470 determines, based on the vehicle interior image, whether or not the person outside the vehicle has boarded the vehicle 102 and the door has been closed (S210), and if the door has not been closed (S210, NO), the door control unit 470 returns to step S210 and stands by until the door is closed. On the other hand, if the door has been closed (S210, YES), the door control unit 470 determines whether or not the vehicle 102 has finished stopping or parking and has started to move (S212). The door control unit 470 may determine that the vehicle 102 has started to move when, for example, the vehicle speed of the vehicle 102 is equal to or greater than a predetermined speed (for example, 5 km/h). As described above, the door control unit 470 may be configured to acquire information regarding the vehicle speed of the vehicle 102 via, for example, the BCM 408.

Then, if the vehicle 102 has not started to move (S212, NO), the door control unit 470 returns to step S204 and repeats the process. On the other hand, if the vehicle 102 has started to move (S212, YES), the door control unit 470 ends the process.

Alternatively, if there is no person present in the vehicle 102 at step S206 (S206, NO), the door control unit 470 moves the process to step S212.

Alternatively, if there is no person outside the vehicle who has performed the unlocking motion at step S204 (S204, NO), the motion information providing unit 466 determines whether or not the near-field communication device 414 of the TCU 410 has established communication with a mobile terminal of any first permitted user associated with the current user (S214). If communication has not been established with a mobile terminal of any first permitted user (S214, NO), the motion information providing unit 466 determines whether or not the near-field communication device 414 of the TCU 410 has established communication with a mobile terminal of any second permitted user associated with the current user (S216).

Then, if the near-field communication device 414 has established communication with a mobile terminal of a second permitted user (S216, YES), the motion information providing unit 466 determines, based on the current recognition result of the person recognition unit 468, whether or not a person who is a registered user is present in the vehicle 102 (S218). If a person who is a registered user is present in the vehicle 102 (S218, YES), the motion information providing unit 466 determines whether or not a transmission request for the motion information has been received from the mobile terminal with which communication has been established (S220). If a transmission request for the motion information has been received from the mobile terminal (S220, YES), the motion information providing unit 466 transmits the motion information to the mobile terminal with which the near-field communication device 414 has established communication (S222), and then moves the process to step S212.

On the other hand, if communication has not been established with a mobile terminal of any second permitted user at step S216 (S216, NO), if no person who is a registered user is present in the vehicle 102 at step S218 (S218, NO), or if no transmission request for the motion information has been received from the mobile terminal with which communication has been established at step S220 (S220, NO), the motion information providing unit 466 moves the process to step S212.

Alternatively, if the near-field communication device 414 has established communication with a mobile terminal of any first permitted user at step S214 (S214, YES), the motion information providing unit 466 moves the process to step S222.

It should be noted that the present invention is not limited to the configuration of the embodiment described above, and that it may be implemented in various forms within a scope that does not depart from the gist of the invention.

For example, in the above embodiment, the specific permitted user, the first permitted user, and the second permitted user are respectively shown as persons 140, 142, and 144, but the number of specific permitted users, first permitted users, and second permitted users is not so limited, and may be any number.

Further, in the above embodiment, the person 140 who is the specific permitted user, the person 142 who is the first permitted user, and the person 144 who is the second permitted user respectively have mobile terminals 150, 152, 154 as terminal devices to receive the motion information, but the device receiving the motion information is not limited to a mobile terminal. The specific permitted user, the first permitted user, and the second permitted user may each use a terminal device of their preference instead of the mobile terminal to receive the motion information.

Depending on method of use, such a terminal device may be, other than a mobile terminal such as a smartphone or the like, any device equipped with near-field communication functionality such as Bluetooth® and/or Wi-Fi® communication functionality, such as a desktop personal computer (PC), a portable PC, a tablet PC, an onboard audio visual (AV) device, etc.

In addition, for example, in the above embodiment, the persons 140, 142, 144 approach the vehicle 102 while holding mobile terminals 150, 152, 154 which are terminal devices, but a person outside the vehicle who performs the unlocking motion of the vehicle 102 does not necessarily need to carry a terminal device. After receiving the motion information to some kind of terminal device from the usage managing server 106 or the onboard system 104, the person outside the vehicle may instruct the door opening operation of the vehicle 102 by approaching the vehicle 102 and performing the unlocking motion without holding the terminal device, so long as he or she can remember the unlocking motion indicated by the motion information, and so long as the motion is performed before the usage managing server 106 determines a new unlocking motion.

Further, in the above embodiment, the vehicle control system 100 is composed of the usage managing server 106 and the onboard system 104, but the configuration of the vehicle control system 100 is not so limited. For example, the vehicle control system 100 may be composed of an onboard device having the same functions as the usage managing server 106, and the onboard system 104, as an aggregate of onboard devices. Alternatively, the vehicle control system 100 may be configured as one device installed in the vehicle 102.

Further, the vehicle control device 402 and the user managing device 406 may alternatively be provided in the usage managing server 106 rather than the onboard system 104, whereby the vehicle control system 100 is constructed by the usage managing server 106 and the onboard image acquisition device 404. In this case, the usage managing server 106 may be configured to acquire vehicle interior images and vehicle exterior images from the image acquisition device 404 via the communication network 108 and the TCU 410 of the vehicle 102, and to instruct the BCM 408 to perform an opening operation on a door of the vehicle 102.

As described above, the vehicle control system 100 according to the present embodiment includes a vehicle exterior image acquisition unit 432 that acquires vehicle exterior images, which are images of the external surroundings of the vehicle 102, and a vehicle interior image acquisition unit 434 that acquires vehicle interior images, which are images of the interior of the vehicle 102. In addition, the vehicle control system 100 includes a person recognition unit 468 that recognizes, based on the vehicle exterior images and the vehicle interior images, the presence of a person inside the vehicle 102 and the motions of a person outside the vehicle 102, a door control unit 470 that controls the state of the doors of the vehicle 102, and a motion determination unit 230 that determines an unlocking motion which is a specific motion to be performed by the person outside the vehicle when instructing a door opening operation of the vehicle 102. If the presence of a person in the vehicle has been recognized based on the recognition result of the person recognition unit 468, the door control unit 470 executes the opening operation on a door of the vehicle 102 when the person outside the vehicle has performed the unlocking motion determined by the motion determination unit 230.

According to this configuration, it is possible to ensure security of the vehicle 102 while supporting smooth boarding by persons other than registered users.

In addition, in the vehicle control system 100, the motion determination unit 230 determines the unlocking motion at a predetermined timing. According to this configuration, since the unlocking motion is updated as appropriate, it is possible to prevent an unlocking motion that has been used from later being used by a third party to unlock the doors of the vehicle 102.

In addition, the vehicle control system 100 includes a storage device 204 that stores user information 206 including information on a registered user registered in advance as a user of the vehicle 102 and terminal information regarding terminal devices of persons who have a specific relationship with the registered user. Further, the vehicle control system 100 includes a user identifying unit 444 that identifies, of the persons in the vehicle, a registered user who has been registered in advance as a user of the vehicle 102, and a motion information distribution unit 232 that distributes motion information regarding the unlocking motion determined by the motion determination unit 230 to a terminal device located outside the vehicle 102. The motion information distribution unit 232 distributes the motion information to terminal devices of persons who have a specific relationship to the registered user who is a person in the vehicle.

According to this configuration, with the determination of the unlocking motion, the motion information is distributed to persons who have a specific relationship to the registered user, such as family, etc. of the registered user, which improves convenience.

In addition, the vehicle control system 100 includes a motion information providing unit 466 that provides the motion information regarding the unlocking motion determined by the motion determination unit 230 to a terminal device located outside the vehicle 102 by near-field wireless communication. When communication has been established with a terminal device of, for example, a first permitted user approaching the vehicle 102, the motion information providing unit 466 transmits the motion information to the terminal device.

According to this configuration, the first permitted user, for example, can acquire the motion information by simply approaching the vehicle 102 while holding the terminal device, which improves convenience.

In addition, the vehicle control system 100 includes a motion information providing unit 466 that provides the motion information regarding the unlocking motion determined by the motion determination unit 230 to a terminal device located outside the vehicle 102 by near-field wireless communication, and a user identifying unit 444 that identifies a registered user among persons in the vehicle. The motion information providing unit 466 transmits the motion information to a terminal device of, for example, a second permitted user approaching the vehicle 102 in response to receiving a request from the terminal device, on the condition that the presence of a person in the vehicle who is a registered user has been recognized based on the recognition result of the person recognition unit 468.

According to this configuration, it is possible to ensure a higher security against, for example, persons set by the registered user as second permitted users based on the depth of their trust relationship, compared to first permitted users who have a deeper trust relationship, while supporting smooth boarding of the vehicle 102 by the second permitted users.

In addition, in the vehicle control system 100, the door opening operation of the vehicle 102 is an automatic operation of opening the doors, or setting the doors to be openable from outside the vehicle 102. According to this configuration, the door control unit 470 is able to support smooth boarding by persons outside the vehicle not only by automatically opening the doors, but by various operations such as unlocking the doors, ejecting a doorknob stowed in the door to be in an operable state, etc.

In addition, the vehicle control system 100 includes a usage managing server 106 that is communicably connected to an onboard device of the vehicle 102 to constitute the vehicle control system, which usage managing server 106 includes a motion determination unit 230 that determines an unlocking motion. According to this configuration, an unlocking motion can be determined and motion information indicating the unlocking motion can be distributed to permitted users even when the power supply of the onboard device of the vehicle 102 is turned off. Further, according to this configuration, by communicably connecting, for example, one usage managing server 106 with onboard devices of a plurality of vehicle 102, determination of an unlocking motion and management of distribution destinations for the motion information for each of the plurality of vehicles 102 may be performed by a single usage managing server 106.

In addition, by means of processing devices 200, 430, 440, 460, which are computers that perform vehicle control, the vehicle control system 100 executes a vehicle control method that performs the following process. The vehicle control method includes a step of acquiring a vehicle exterior image, which is an image of the external surroundings of the vehicle 102 (S200), and a step of acquiring a vehicle interior image, which is an image of the interior of the vehicle 102 (S200). In addition, the vehicle control method includes a step of recognizing, based on the vehicle exterior image and the vehicle interior image, a motion of a person outside the vehicle 102 and the presence of a person in the vehicle 102 (S202), a step of controlling the state of the doors of the vehicle 102 (S208), and a step of determining an unlocking motion which is a specific motion to be performed by the person outside the vehicle when instructing a door opening operation (S100). If the presence of a person in the vehicle has been recognized based on the recognition result of the above step of recognizing (YES at S206), then, at the above step of controlling, the door opening operation of the vehicle 102 is executed when the person outside the vehicle has performed the unlocking motion which is the specific motion determined in the above step of determining (YES at S204).

According to this configuration, it is possible to ensure security of the vehicle 102 while supporting smooth boarding by persons other than registered users.

REFERENCE SIGNS LIST

100 Vehicle control system
102 Vehicle
104 Onboard system
106 Usage managing server
108 Communication network
110 Front seat camera
112 Rear seat camera
114 Front camera
116 Right side camera
118 Left side camera
120 Rear camera
122 Driver seat door
124 Passenger seat door
126 Rear right seat door
128 Rear left seat door
130, 140, 142, 144 Person
150, 152, 154 Mobile terminal
200, 418, 430, 440, 460 Processing device
202 Communication device
204, 442, 462 Storage device
206 User information
208 Registered user information
210 Facial image information
212 Personal information
214 Specific user information
216 First permitted user information
218 Second permitted user information
230 Motion determination unit
232 Motion information distribution unit
234 User registration unit
236 User information providing unit 400 Onboard network bus
402 Vehicle control device
404 Image acquisition device
406 User managing device
408 BCM
410 TCU
412 UI control device
414 Near-field communication device
416 Long-range communication device
420 Display device
422 Touch panel
424 Speaker
426 Microphone
432 Vehicle exterior image acquisition unit
434 Vehicle interior image acquisition unit
444 User identifying unit
446 User information acquisition unit
448 Person-in-vehicle information
450 User-related information
464 Motion information acquisition unit
466 Motion information providing unit
468 Person recognition unit
470 Door control unit

What is claimed is:

1. A vehicle control system comprising a processor and a memory, wherein the processor:
    acquires a vehicle exterior image, which is an image of an external surrounding of a vehicle;
    acquires a vehicle interior image, which is an image of an interior of the vehicle;
    recognizes, based on the vehicle exterior image and the vehicle interior image, a presence of a person in the vehicle and a motion of a person outside the vehicle;
    controls a state of a door of the vehicle;
    recognizes an arrival of a predetermined timing and updates, at the predetermined timing, a specific motion to be performed by the person outside the vehicle when instructing an opening operation of the door, the specific motion being a specific movement of fingers or a specific gesture using a body; and
    distributes motion information indicating the specific motion as updated to a first terminal device of a registered user who has been registered in advance as a user of the vehicle and a second user terminal device of a specific permitted user who has been recorded, in the memory, in advance, as a person having a specific relationship to the registered user,
    wherein the processor executes the opening operation on the door when the person outside the vehicle has performed the specific motion as updated if the presence of the person in the vehicle has been recognized based on a recognition result of the person motion of the person outside the vehicle.

2. The vehicle control system according to claim 1, wherein
    the memory stores user information including information on the registered user and terminal information regarding the second terminal device of the specific permitted user, and
    the processor identifies the registered user based on the user information.

3. The vehicle control system according to claim 1 wherein the processor includes
    provides, through near-field wireless communication, the motion information to a third terminal device located outside the vehicle, and
    when communication has been established with the third terminal device approaching the vehicle, the motion information providing unit transmits the motion information to the third terminal device.

4. The vehicle control system according to claim 1, wherein the processor-includes:
    provides, through near-field wireless communication, the motion information to a third terminal device located outside the vehicle;
    identifies the registered user; and
    transmits the motion information to the third terminal device in response to receiving a request from the third terminal device, on a condition that the presence of the person in the vehicle who is the registered user has been recognized based on the recognition result of the motion of the person outside the vehicle.

5. The vehicle control system according to claim 1, wherein the opening operation comprises an automatic operation of opening the door, or setting the door to be openable from outside the vehicle.

6. A server comprising the processor, the server being communicably connected to an onboard device of the vehicle to constitute the vehicle control system according to claim 1.

7. A vehicle control method executed by a computer performing vehicle control, the method comprising the steps of:
    acquiring a vehicle exterior image, which is an image of an external surrounding of a vehicle;
    acquiring a vehicle interior image, which is an image of an interior of the vehicle;
    recognizing, based on the vehicle exterior image and the vehicle interior image, a motion of a person outside the vehicle and a presence of a person inside the vehicle;
    controlling a state of a door of the vehicle;
    recognizing an arrival of a predetermined timing and updating, at the predetermined timing, a specific motion to be performed by the person outside the vehicle when instructing an opening operation of the door, the specific motion being a specific movement of fingers or a specific gesture using a body;
    distributing motion information indicating the specific motion as updated to a first terminal device of a registered user who has been registered in advance as an user of the vehicle and a second user terminal device of a specific permitted user who has been recorded, in a memory, as a person having a specific relationship to the registered user in advance,
    wherein at the step of controlling, the opening operation of the door is executed when the person outside the vehicle has performed the specific motion as updated, if the presence of the person in the vehicle has been recognized based on a recognition result of the motion of the person outside the vehicle in the step of recognizing.

* * * * *